Patented Dec. 16, 1947

2,432,595

UNITED STATES PATENT OFFICE 2,432,595

PROCESSING IMPURE SOLUTIONS OF SUCROSE

Alfred M. Thomsen, San Francisco, Calif.

No Drawing. Application June 20, 1945,
Serial No. 600,657

6 Claims. (Cl. 127—47)

This application is a continuation in part of application Serial Number 472,563, filed January 16, 1943.

My process can be applied to the extraction of sucrose from plant juices containing same, or from any residuals obtained in the partial extraction of sucrose from such material. It is virtually independent of the concentration of such material as the barium saccharate formed in the process is substantially insoluble in an excess of barium hydroxide. It is essential, however, that the sucrose solution be substantially free from invert sugar or at least that such material be present in but a small ratio when compared with the sucrose content.

Inasmuch as many primary sources of sucrose, such as sugar cane and sorghum, contain much invert sugar, it follows that such material must undergo a preliminary treatment for the removal of the major part of such invert sugar before it can be successfully worked by my process. Sundry strains of yeast that are free from invertase have the power to convert invert sugar into alcohol and carbon dioxide without affecting noticeably the sucrose content and may hence be used for the purpose of removing said invert sugar constituent.

My disclosure is not concerned with the technique of such operations, which constitutes an entirely separate phase of the art, and the statement is made solely for informative purposes. It is stated, however, that after such materials as cane and sorghum have been treated in this manner for the removal of the major part of their invert sugar content, then they are as acceptable for my process as is material originally free from invert, such as sugar beet products.

In my process I remove sucrose in the form of barium saccharate, which as already stated is almost insoluble in a solution containing an excess of barium hydroxide. As this is a very old and well known method, it follows that my disclosure is not concerned with this step but instead with a definite barium cycle which permits the commercial operation of such a process.

Briefly stated, therefore, I add barium hydroxide to a sucrose solution and remove the barium saccharate produced thereby. To get the sugar content of the residual solution as low as ½% of sugar, I find it necessary to keep the excess of barium hydroxide at well above 1%. The barium saccharate is next treated with carbon dioxide for the liberation of the resident sugar, and separation is then made between the resultant barium carbonate and said sugar solution.

Said barium carbonate is then commingled with sufficient sulphuric acid to convert same into the corresponding sulphate, which in turn is then commingled with carbon and heated until reduced to sulphide. The furnace product, referred to hereafter as "clinker," is then dissolved in water and treated with suitable metallic oxides, such as those of copper and zinc, until desulphurized, the final result being a solution of barium hydroxide and an insoluble portion consisting of metallic sulphides and excess oxides.

Separation is next made between said solution of barium hydroxide and the insoluble portion, the former being returned to fresh sucrose solution and the latter, after regeneration by roasting, to fresh barium sulphide solution. The entire operation is thus made cyclic, both as to barium and metallic oxides.

The loss in barium due to the need for an excess of hydroxide in the saccharate step is obviated by carbonating the waste water and removing resident barium as carbonate. Said barium carbonate can then be converted into sulphate in a similar manner to that already disclosed. I find it advantageous to heat said waste barium hydroxide solution under pressures in excess of atmospheric for several hours prior to said carbonation. Manifestly, the waste solution could be directly neutralized with sulphuric acid and barium sulphate obtained directly, but if this were tried upon the saccharate some undesirable side reactions take place which makes the intermediate carbonation step definitely superior.

The operation can likewise be made cyclic as to sulphur, for it is evident that the sulphur dioxide evolved in the roasting of the metallic sulphides can be converted to sulphuric acid and thus recommence the cycle. As purely orthodox chemical methods would be required to bring about such changes, it is unnecessary to describe the methods required to bring about such changes, mere mention of the fact being deemed sufficient.

Having thus fully described my process, I claim:

1. The extraction of sucrose from impure solutions of same in any state of concentration but substantially free from invert sugar which comprises; commingling said solution of sucrose with an excess of barium hydroxide; separating the barium saccharate produced; converting said barium saccharate into barium carbonate by treatment with carbon dioxide with simultaneous liberation of sucrose; separating said barium carbonate from the sucrose solution; converting the barium carbonate into barium sulphate by the addition of sulphuric acid; reducing said barium sulphate to sulphide by heating with carbon and making a water solution of same; desulphurizing said barium sulphide solution by the addition of metallic oxides capable of removing the sulphur, thus forming barium hydroxide and the corresponding metallic sulphides; separating the metallic sulphides from the barium hydroxide solution and returning the latter cyclically to fresh impure solutions of sucrose; roasting said separated metallic oxides to obtain sulphur dioxide and regenerated metallic oxides; and returning said regenerated metallic oxides to the process for the conversion of barium sulphide to barium hydroxide, where and as previously indicated.

2. The extraction of sucrose from impure solutions of same in any state of concentration but substantially free from invert sugar, set forth in claim 1, with the added step that the sulphur dioxide set free in the roasting step be converted into sulphuric acid and cyclically returned to the process where the use of sulphuric acid is required.

3. The extraction of sucrose from impure solutions of same in any state of concentration but substantially free from invert sugar, set forth in claim 1, with the added step that the barium containing solution rejected from the saccharate step be treated with carbon dioxide and the resultant barium carbonate separated and returned to the sulphate step of the process.

4. The extraction of sucrose from impure solutions of same in any state of concentration but substantially free from invert sugar, set forth in claim 1, with the added step that the barium containing solution rejected from the saccharate step be heated to temperatures above 212° F., treated with carbon dioxide, and the resultant barium carbonate separated and returned to the sulphate step of the process.

5. The extraction of sucrose from impure solutions of same in any state of concentration but substantially free from invert sugar, set forth in claim 1, with the added step that the barium containing solution rejected from the saccharate step be neutralized with sulphuric acid and the resultant barium sulphate separated and returned to the reduction step of the process.

6. The extraction of sucrose from impure solutions of same in any state of concentration but substantially free from invert sugar, set forth in claim 1, with the added step that the barium containing solution rejected from the saccharate step be heated to temperatures above 212° F., neutralized with sulphuric acid and the resultant barium sulphate separated and returned to the reduction step of the process.

ALFRED M. THOMSEN.

REFERENCES CITED

The following references are of record in the file of this patent:

UNITED STATES PATENTS

| Number | Name | Date |
| --- | --- | --- |
| 2,380,087 | Thomsen | July 10, 1945 |